United States Patent
Zalik et al.

(10) Patent No.: US 11,823,259 B2
(45) Date of Patent: Nov. 21, 2023

(54) SYSTEMS AND METHODS FOR SECURED FUND ALLOCATION AND PROVISION

(71) Applicant: GreenSky Software, LLC, Atlanta, GA (US)

(72) Inventors: David Zalik, Atlanta, GA (US); Stefan Woulfin, Atlanta, GA (US); Kyle Cochran, Atlanta, GA (US); Matthew Baxter, Atlanta, GA (US); Chris Parks, Atlanta, GA (US); Joshua Melcher, Atlanta, GA (US); Rahul Kulkarni, Atlanta, GA (US); Guhan Raaghavan, Atlanta, GA (US); Paul Anderson, Atlanta, GA (US); Paul Rafferty, Atlanta, GA (US); Timothy Kaliban, Atlanta, GA (US); Michael Schuman, Atlanta, GA (US); William Still, Atlanta, GA (US)

(73) Assignee: GreenSky Software, LLC, Atlanta, GA (US)

( * ) Notice: Subject to any disclaimer, the term of this patent is extended or adjusted under 35 U.S.C. 154(b) by 0 days.

(21) Appl. No.: 17/039,966

(22) Filed: Sep. 30, 2020

(65) Prior Publication Data

US 2022/0101427 A1    Mar. 31, 2022

(51) Int. Cl.
G06Q 40/00    (2023.01)
G06Q 40/03    (2023.01)

(52) U.S. Cl.
CPC .................... *G06Q 40/03* (2023.01)

(58) Field of Classification Search
CPC .................... G06Q 40/025; G06Q 40/02
See application file for complete search history.

(56) References Cited

U.S. PATENT DOCUMENTS

| | | | |
|---|---|---|---|
| 7,653,592 B1 * | 1/2010 | Flaxman | G06Q 40/00 705/38 |
| 7,676,409 B1 * | 3/2010 | Ahmad | G06Q 20/204 705/35 |
| 10,726,477 B1 * | 7/2020 | Zalik | G06Q 40/03 |
| 2002/0103748 A1 * | 8/2002 | Abhyanker | G06Q 40/02 705/37 |
| 2006/0190322 A1 * | 8/2006 | Oehlerking | G06Q 20/10 705/14.21 |
| 2010/0030683 A1 * | 2/2010 | Keiser | G06Q 40/06 705/37 |

(Continued)

OTHER PUBLICATIONS

Open Banking: Definition and Description IEEE (Year: 2021).*
(Continued)

*Primary Examiner* — Bruce I Ebersman
(74) *Attorney, Agent, or Firm* — TROUTMAN PEPPER HAMILTON SANDERS LLP; Christopher C. Close, Jr.

(57) ABSTRACT

In an example implementation, a method includes receiving, at a computing device, borrower information and requested financing plan information. Likewise, a method includes outputting at least a portion of the received information to a second computing device and, after receiving an indication of a decision denying the requested financing plan, outputting at least a portion of the received information to a computing device associated with a lender and confirming, to a computing device associated with a borrower or a merchant that the information has been sent to the lender.

9 Claims, 8 Drawing Sheets

(56) References Cited

U.S. PATENT DOCUMENTS

| | | | | |
|---|---|---|---|---|
| 2012/0284173 A1* | 11/2012 | Monjanel | ............... | G06Q 40/02 |
| | | | | 705/38 |
| 2013/0110655 A1* | 5/2013 | Biafore | ................. | G06Q 40/00 |
| | | | | 705/16 |
| 2015/0178829 A1* | 6/2015 | Weiss | .................... | G06Q 40/02 |
| | | | | 705/38 |
| 2017/0161825 A1* | 6/2017 | Nair | ...................... | G06Q 40/03 |
| 2020/0387923 A1* | 12/2020 | Mitchell | ................ | G06Q 20/12 |
| 2022/0051316 A1* | 2/2022 | Bouchard | .............. | G06Q 40/03 |

OTHER PUBLICATIONS

Open Banking: What It Is, Where It's at, and Where It's Going IEEE (Year: 2022).*
Blockchain-Based Financial Technologies and Cryptocurrencies for Low-Income People: Technical Potential Versus Practical Reality IEEE 2020 (Year: 2020).*
Open Banking: What It Is, Where It's at, and Where It's Going IEEE 2022 (Year: 2022).*

* cited by examiner

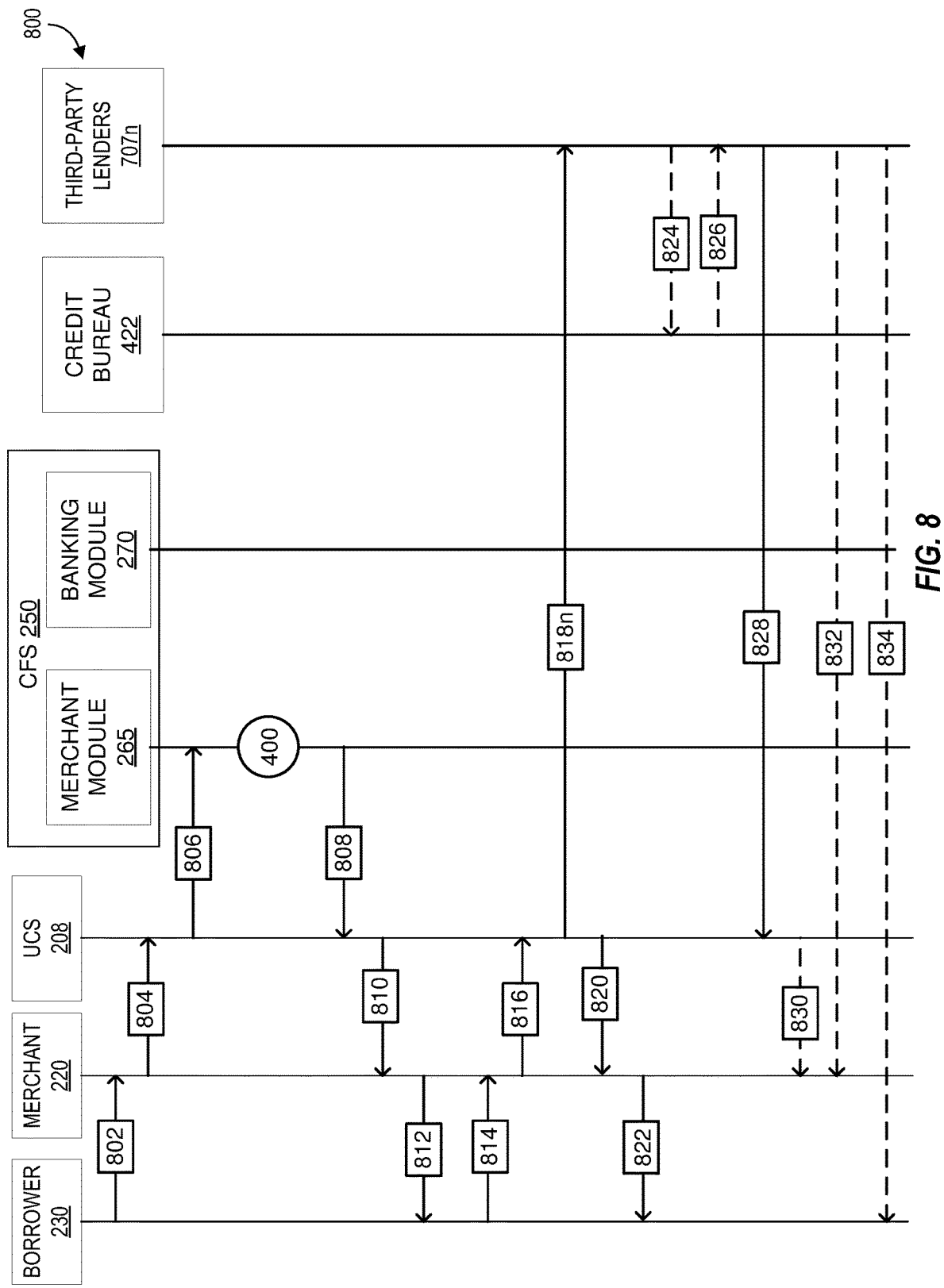

SYSTEMS AND METHODS FOR SECURED FUND ALLOCATION AND PROVISION

TECHNICAL FIELD

Aspects of the present disclosure relate to systems and methods for facilitating the applications for loans as well as the underwriting, origination, and assignment of such loans.

BACKGROUND

While potential borrowers may wish to undertake large-scale home improvement projects or other projects that require significant funds, it may be difficult to obtain funding for such projects when the borrower wishes to finance the project. For example, if a borrower wants to replace the roof on her house or purchase furniture for her house, the overall cost may be more than what is available in a typical credit line while being much smaller than a typical loan or home equity line of credit. Further, it may be more convenient for a merchant (e.g., a roofing company or furniture dealer) to accept and process credit card payments in which case a mortgage loan may not be appropriate for the borrower's needs. Further still, while a borrower may have access to funds to finance such a project (e.g., the borrower has available cash or credit on hand), it may be attractive to obtain a loan with favorable terms instead of using the borrower's own funds, and obtaining a mortgage loan can be a time-consuming and stressful endeavor.

Further, existing systems seek to match borrowers and merchants with specific pools of lenders. Those existing systems request specific information from borrowers to facilitate a loan with a pool of lenders based on that pool of lenders' lending criteria. But if lenders in that pool are unable or unwilling to facilitate a loan on behalf of that borrower, the borrower is forced to go through the application process again, re-providing the same information and any additional information that the next pool of lenders may require. This process is cumbersome and time-consuming, and it can, on the one hand, cause significant embarrassment for a borrower whose application is denied and, one the other hand, cause discomfort for the merchant who has to tell the borrower that their loan application has been denied and that they have to repeat the process. Accordingly, what is needed are systems and methods for facilitating the applications for, origination of, and assignment of loans that are flexible and provide access to multiple lenders and/or pools of lenders and that allow borrowers to have a minimally intrusive user experience. What also is needed are systems and methods can provide a borrower near-instant access to the funds associated with the loan such that a merchant can accept payment from the loan funds in the same manner that the merchant processes a typical credit card payment.

SUMMARY

Some or all of the above needs may be addressed by certain implementations of the disclosed technology. Implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 8 is a sequence diagram illustrating an example loan facilitation process 800 that can involve one or more third-party lenders, according to an example implementation.

DETAILED DESCRIPTION

Figure 1:
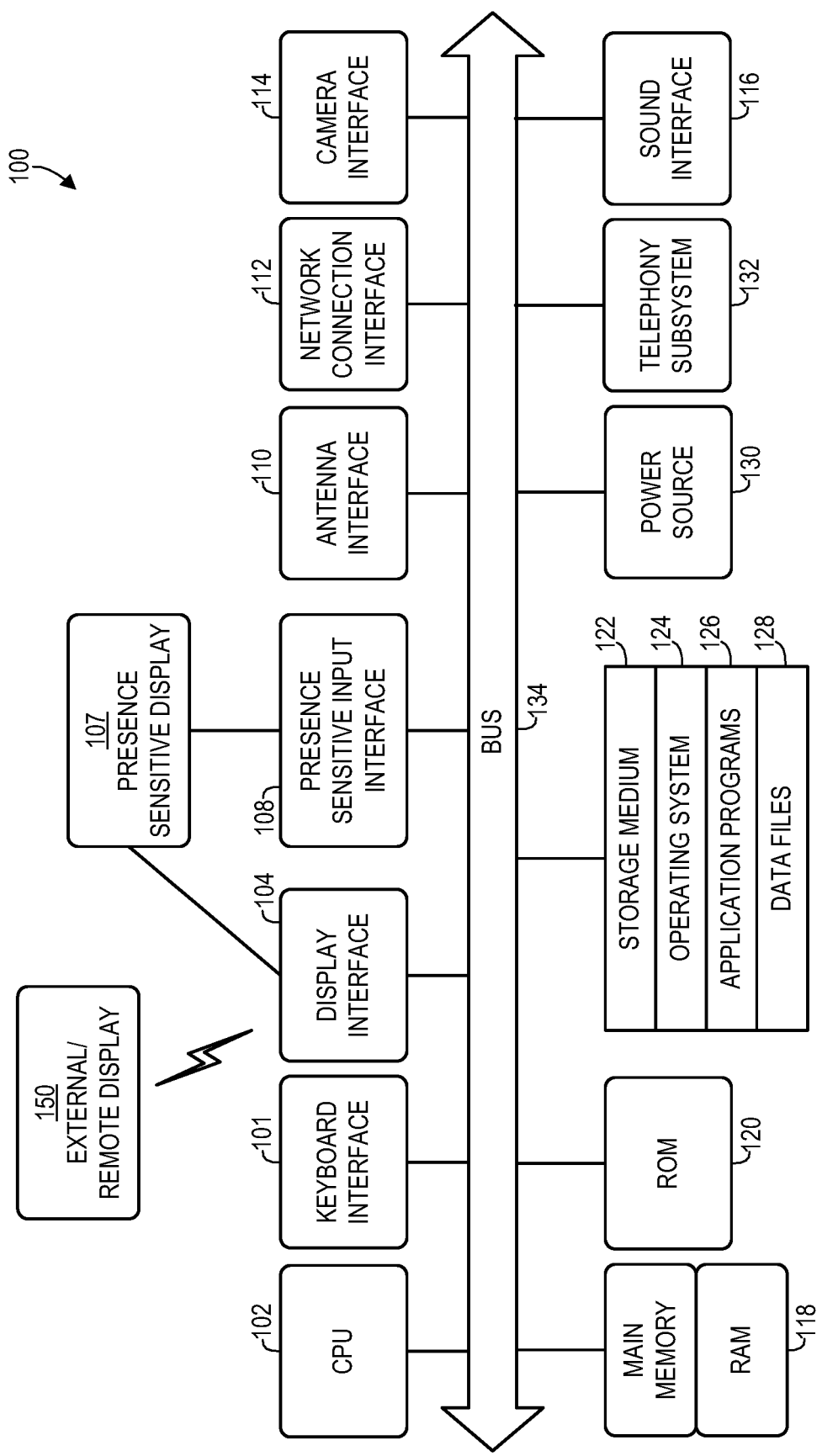
FIG. 1 is a block diagram of an illustrative computer system architecture 100, according to an example implementation.

In some implementations of the disclosed technology, a consumer finance system ("CFS") may receive information relating to one or more merchants (i.e., merchant information), which may be service providers, retailers, etc., who want the ability to offer financing plans to their customers (i.e., potential borrowers). Upon receiving merchant information, a CFS may initiate a merchant credentialing process to determine what types of financing plans a merchant is qualified to offer. In some embodiments, a CFS may request credentialing information relating to the merchant from one or more third-party sources. For example, a CFS may request information relating to the merchant's creditworthiness or fraud potential. After receiving credentialing information relating to the merchant, the CFS may then assign one or more rate plans to the merchant, which the merchant can then offer to their customers (i.e., potential borrowers). As will be understood, the rate plans may have varying terms (e.g., 12 months with no financing charge, 36 months with an interest rate of 5.9%, etc.), and merchants having more favorable credentialing information, as determined by the CFS, may be assigned preferred rate plans, which may be more desirable to their potential customers.

Further, in some implementations of the disclosed technology, a CFS may receive information relating to a potential borrower (i.e., borrower information) and a requested financing plan, which may be received directly from a potential borrower or a merchant associated with the CFS with the potential borrower's consent. In other implementations, a CFS may receive such information from a universal crediting system ("UCS") configured to serve as an intermediary between the CFS and various merchants, potential borrowers, and third-party lenders ("TPLs"). In such implementations, upon receipt of the borrower information, which may include the requested financing plan, the CFS may initiate an underwriting process. In one implementation, based on the borrower information, the CFS may request credit bureau information relating to the potential borrower. Based on the credit bureau information, the borrower information, and the requested financing plan, the CFS may determine, from a plurality of banking partners or lenders, a subset of lenders that may be willing to approve the requested financing plan based on the bank credit policies of the lenders. Upon determining the subset of lenders, the CFS may perform a portfolio assignment process in which the requested financing plan is assigned to a particular lender in the subset of lenders who have committed a consortium of funds to be assigned by the CFS. After assigning the loan, the CFS may transmit a credit offer (i.e., a confirmed offer of a financing plan) for delivery to the borrower (e.g., to the borrower, the merchant, or the UCS for further transmission to the borrower and/or merchant). Further, in one implementation, after receiving acceptance of the credit offer, the CFS may generate electronic loan documents, which the CFS outputs for delivery to the buyer (e.g., to the borrower, the merchant, or the UCS for further transmission to the borrower and/or merchant). In an example implementation, the electronic loan documents may comprise a transaction processing access device, which may allow the borrower to access funds from the loans and utilize the funds with a merchant capable of processing credit card payments.

In yet other implementations of the disclosed technology, after conducting the underwriting process, the CFS may be unable to identify any lenders that may be willing to approve the requested financing plan based on the bank credit policies of the lenders. Upon such a determination, the CFS may notify the UCS, which may in turn notify the merchant and/or borrower. The borrower may provide additional information to the UCS, which may then transmit the borrower's information to one or more TPLs. For example, the UCS may transmit the borrower's information to a single TPL, to a plurality of TPLs (i.e., a shotgun approach), or to one or more TPLs in the plurality of TPLs in sequence based on responses received from the TPLs (i.e., a waterfall approach) according to the merchant's policies relating to TPLs. In one implementation, TPLs may request credit bureau information relating to the potential borrower based on their own internal policies. Upon receiving a confirmation from a TPL that the TPL plans to accept a financing plan for the borrower (which may be different from the initially requested financing plan), the UCS may notify the merchant of such acceptance. Separately the TPL may notify the merchant and/or borrower of additional steps relating to the financing plan.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums, and that one of skill in the art will be familiar with such architectures.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, Bluetooth-connected device, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or wearable computer. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
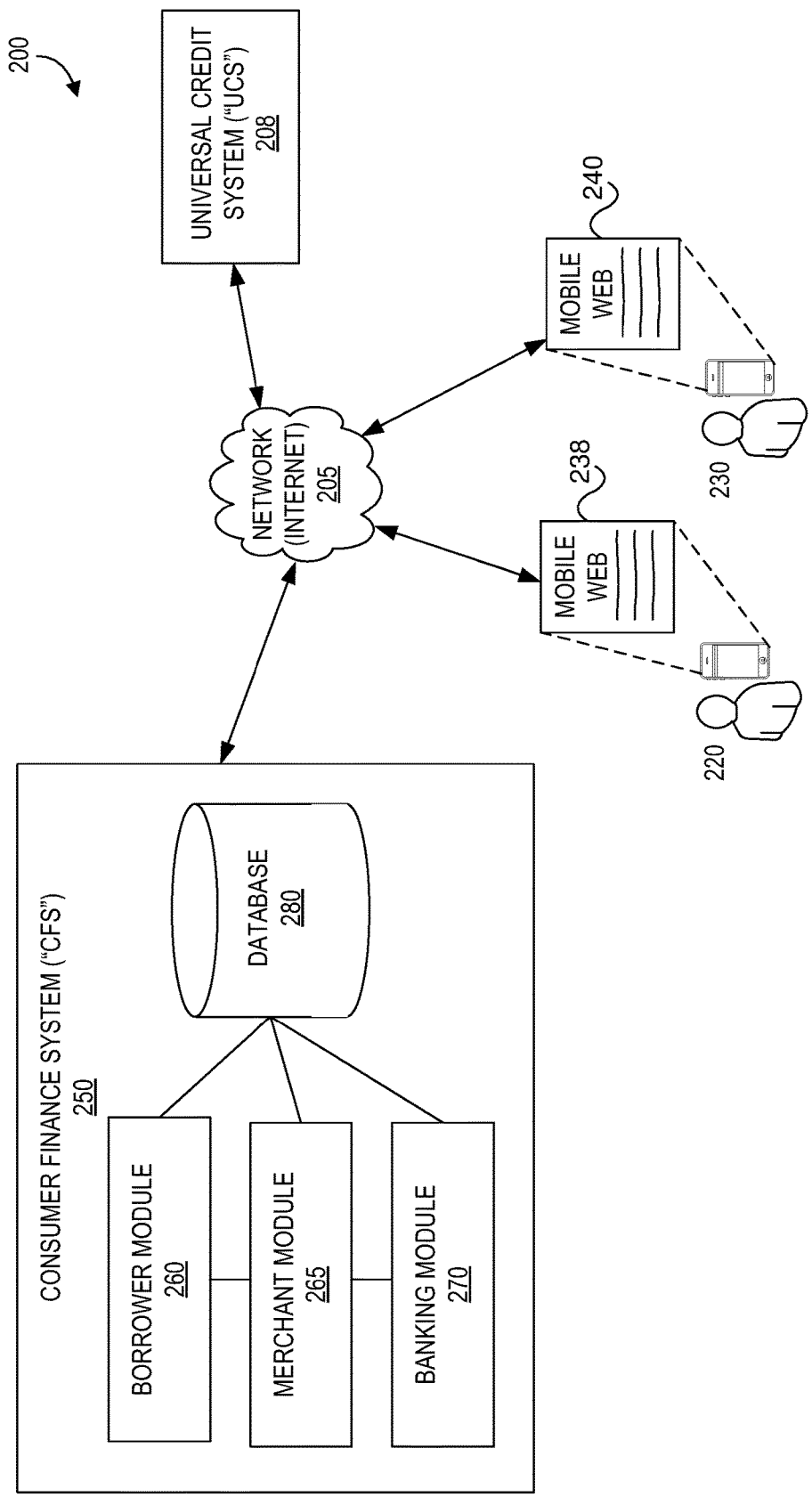
FIG. 2 is an overview of an environment 200 in which a consumer finance system 250 is utilized, according to an example embodiment.

FIG. 2 is an overview 200 of an embodiment of a consumer finance system ("CFS") 250 and a universal credit system ("UCS") 208 in an exemplary environment, constructed and operated in accordance with various aspects of the present disclosure. As shown in FIG. 2, a CFS 250 may comprise a borrower module 260 for carrying out various computer-implemented processes of the CFS 250. The CFS 250 may likewise include a banking module 270 and a merchant module 265 for carrying out various other computer-implemented processes of the CFS 250. Embodiments of a CFS 250 further include various databases for storing system data, such as database 280. As with CFS 250, UCS 208 may include various software modules, engines, and databases.

According to various embodiments, an implementation of a CFS 250 and/or a UCS 208 may include some or all of the components of the computing device 100 shown in FIG. 1. Additionally, according to the embodiment shown in FIG. 2, a CFS 250 may comprise a borrower module 260, a banking module 270, and a merchant module 265 that are operatively connected as a unitary system. Alternatively, the borrower module 260, banking module 270, and merchant module 265 may be physically separated and be connected through a network (e.g., network 205, which may be the Internet). Generally, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system.

According to some embodiments of the present disclosure, a CFS 250 and/or a UCS 210 is hosted on a third-party physical server located on a cloud server. A CFS 250 and a UCS 210 can be co-located on the same third-party physical server or on separate servers. Further, according to some embodiments, the borrower module 260, merchant module 265, and banking module 270 are servers or collections of software relating to a plurality of software modules, processes, subroutines, or various algorithms operated by an embodiment of a CFS 250, and UCS 210 may be a collection of software relating to a plurality of software modules, processes, subroutines, or various algorithms operated by an embodiment of a UCS 210. Further, as noted, according to some embodiments, the borrower module 260, merchant module 265, and banking module 270, and the various sub-modules and processes that make up the modules, are connected to a database 280 for storing various types of data utilized by the CFS 250.

Generally, in addition to being connected to one another, a CFS 250 and a UCS 210 includes operative (and preferably wireless) connections to potential customers or users, which may be one or more merchants 220 or one or more borrowers 230, typically through a mobile device or general purpose computer, which may include some or all of the components of the computing device 100 shown in FIG. 1. As shown in FIG. 2, merchants 220 or borrowers 230 may utilize mobile devices (i.e., 238 and 240, respectively), which may provide access to a CFS 250 or a UCS 208 via a web page, mobile application, etc. In some embodiments, a mobile application executing on a mobile device (i.e., 238 or 240) may be specifically configured to access a CFS 250 or a UCS 208. Further, in some embodiments, a merchant 220 or buyer 230 may interact with a proprietary mobile application or internal system executing on their mobile device (e.g., 238 or 240, respectively), which may be configured to communicate with a CFS 250 or a UCS 208, or a mobile application associated with the CFS 250 or the UCS 208. In addition to a mobile device (e.g., 238 or 240), a borrower 230 or merchant 220 may access a CFS 250 or a UCS 208 using a desktop computer, laptop computer, tablet device, etc., using a web browser or application configured for the particular device, according to an example embodiment. Further, a CFS 250 or a UCS 208 may access a backend computing system of a merchant 220 to provide information relating to a requested loan or other information relevant to a relationship with a particular merchant 220.

Generally, operative connections between a CFS 250, a UCS 208, and a user (e.g., borrower 230 or merchant 220) involve a secure connection or communications protocol and communications over a network 205 (e.g., the Internet) may involve use of one or more services as described above and as will be understood by one of ordinary skill in the art. Further, various networking components such as routers, switches, hubs, etc., are typically involved in such communications, and although not explicitly shown in FIG. 2, certain embodiments of the present disclosure may include one or more secure networks, gateways, or firewalls that provide information security from unwarranted intrusions and cyber attacks.

Generally, borrowers 230 include individuals who may be interested in obtaining a financial loan for a variety of purposes. For example, a borrower 230 may be interested in hiring professionals (e.g., merchants 220) to complete one or more home improvement projects at the borrower's 230 home. For example, a borrower 230 may be interested in hiring a merchant 220 to replace the roof, gutters, or windows at the borrower's 230 home. In certain circumstances, the borrower 230 may not have the means to pay for the home improvement project and thus may be interested in financing the project (i.e., borrowing money from a lender to pay for the project and paying the lender back over time by way of incremental payments).

As noted, merchants 220 may include contractors or service providers. For example, a merchant 220 may be a roofing company, painting company, general contractor, or any other service provider. In various circumstances, merchants 220 may be willing to facilitate a process by which potential customers (e.g., borrower 230) may obtain financing for the merchants' 220 services.

The discussions above in association with FIGS. 1 and 2 are merely intended to provide an overview of an embodiment of the present consumer finance system. Accordingly, it will be understood that the descriptions in this disclosure are not intended to limit in any way the scope of the present disclosure. In particular, the architecture as well as the specific modules and databases shown in FIG. 2 are shown for illustrative purposes only, and embodiments of the present system are not limited to a specific architecture, as a CFS 250 and a UCS 208 may comprise any combination of modules, components, and databases necessary to perform the functions described herein. The functions and operations of these exemplary modules and system components are described in greater detail below with respect to the various sequence diagrams and figures displayed in FIGS. 3-8.

Figure 3:
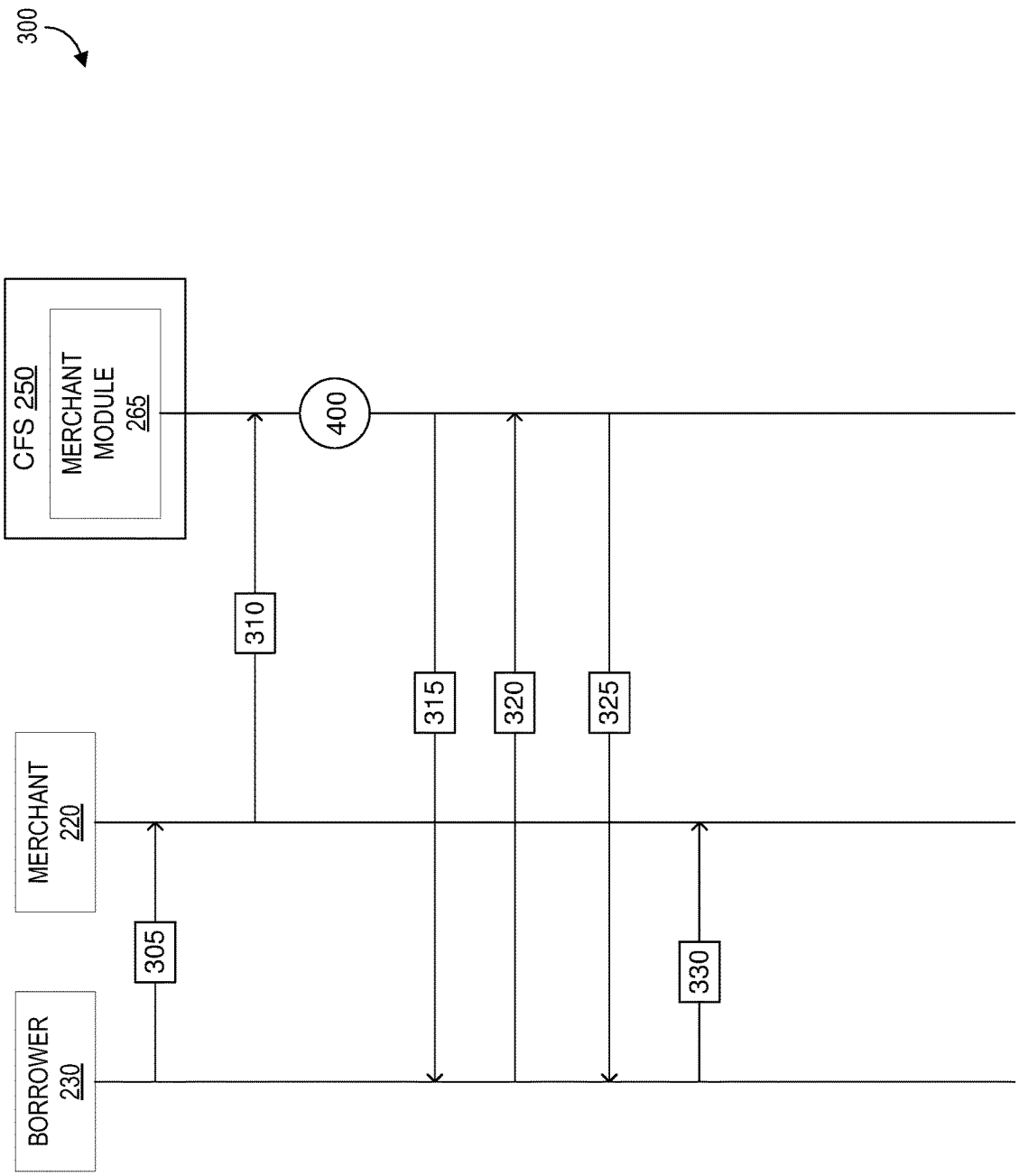
FIG. 3 is a sequence diagram illustrating an exemplary credit application process 300, according to an example implementation.

FIG. 3 is a sequence diagram illustrating an exemplary credit application process 300, which may be completed in real time, according to some embodiments. As discussed above, a borrower 230 may be interested in acquiring various services from a merchant 220. For example, a borrower 230 may be interested in hiring a merchant 220 to replace the roof on the borrower's 230 house or buying furniture. In some embodiments, the merchant 220 may have access to a CFS 250, which may be used to request financing on behalf of and with the consent of borrower 230 so that the borrower 230 can pay the merchant 220 to provide the service (e.g., replacing the roof on the borrower's 230 house or selling furniture to the borrower 230). In an example scenario, at 305, a borrower 230 provides borrower information (i.e., credit application information) to a merchant 220, which may be used to obtain financing. For example, a borrower 230 may provide one or more of name, Social Security number, address, date of birth, and any other information that may be used to identify the borrower 230.

The borrower 230 may provide the borrower information to the merchant 220 in a variety of ways. For example, the borrower 230 may simply fill out a paper form, which the merchant may transmit to the CFS 250 (e.g., via a web browser), according to some embodiments. In another embodiment, the borrower 230 may provide the information to an application such as a mobile application that may be running on a computing device (e.g., 238 or 240). In certain embodiments, a mobile application may be configured to receive the borrower information from a borrower 230 from a valid form of identification such as a driver's license or a passport. For example, in some embodiments, a mobile application may be configured to scan a driver's license or other piece of identification for relevant borrower information, for example by utilizing optical character recognition ("OCR") or by scanning a barcode. In some embodiments, a CFS 250 may receive geolocation information from a mobile device (e.g., 238 or 240), which may allow the CFS 250 to verify certain borrower information. Further, a CFS 250 may receive certain borrower information (e.g., a borrower's address) from geolocation information received from a mobile device (e.g., 238 or 240). Additionally, in some embodiments, geolocation information may assist a CFS 250 in preapproving certain borrowers 230. For example, a merchant may target a particular area (e.g., a neighborhood) for providing services (e.g., roofing services) and offering financing plans to pay for those services. In some embodiments, using geolocation information, a CFS 250 may preapprove potential borrowers 230 in the neighborhood such that the merchant 220 may be more efficient in terms of making offers to pre-qualified borrowers 230.

In some embodiments, a borrower 230 may provide borrower information directly to the CFS 250 without the aid of a merchant 220. For example, a borrower 230 may provide borrower information verbally over the phone to a representative of the CFS 250 or via a website provided by the CFS 250, which may be received by a borrower module 260 according to some embodiments. Additionally, a borrower may provide information via fax, mail, interactive voice response (IVR), or other means, which may be received by a representative associated with the CFS 250 and input into the CFS 250. Thus, as will be appreciated, in some embodiments, a borrower 230 may contact the CFS 250 directly to initiate a credit application process 300. In that way, prior to selecting a merchant 220, a borrower 230 can obtain financing for a project.

In addition, in some embodiments, in addition to providing contact information at 305, a borrower 230 may provide an indication of a financing plan the borrower 230 is interested in obtaining (i.e., requested financing plan information). For example, a merchant 220 may present a plurality of financing plans to a borrower 230 depending on various criteria (e.g., the amount of money the borrower 230 needs to finance, the amount of money the borrower 230 can pay each month, how much time the borrower 230 intends to take to pay back the loan, etc.). In some embodiments, a merchant 220 may present a borrower with financing plans such as "no interest for 12 months," "5.9% interest for 60 months," etc. As will be understood and appreciated, any number of financing plans may be available for presentation to a borrower 230.

As shown in FIG. 3, after the merchant 220 receives the borrower information and financing plan information from the borrower 230, the merchant may transmit the borrower information and financing plan information to a merchant module 265 of a CFS 250, at 310, according to some embodiments. As discussed, a merchant 220 may receive borrower information from a borrower 230 via, for example, a mobile application running on a mobile device (e.g., 238 or 240). The mobile device 238 may then transmit the borrower information and financing plan information to the merchant module 265 of the CFS 250. For example, the mobile device 238 may transmit the borrower information and financing plan information to the merchant module via a network 205 such as the internet. Upon receipt of the borrower's 230 borrower information (and requested financial plan, according to example embodiments), the merchant module 265 may initiate an underwriting process 400, which will be discussed in relation to FIG. 4.

Following the underwriting process 400, in some embodiments, a merchant module 265 may transmit a credit offer (i.e., a confirmed offer of a financing plan) to the borrower 230 for the borrower to accept or reject, at 315. For example, merchant module 265 may transmit the credit offer (i.e., confirmed offer) directly to the borrower 230 (e.g., to a website or a mobile application running on a mobile device (e.g., 240) operated by the borrower 230). In one example embodiment, the merchant module 265 may transmit the confirmed offer to the merchant 220, who may then present the offer to the borrower 230.

If the borrower 230 is interested in accepting the credit offer (i.e., accepting the confirmed offer of a financing plan), the borrower may transmit an acceptance of the confirmed offer of a financing plan to the merchant module 265, at 320, according to some embodiments. In some embodiments, the borrower 230 may reject the offer and pursue an alternative financing plan.

Figure 4:
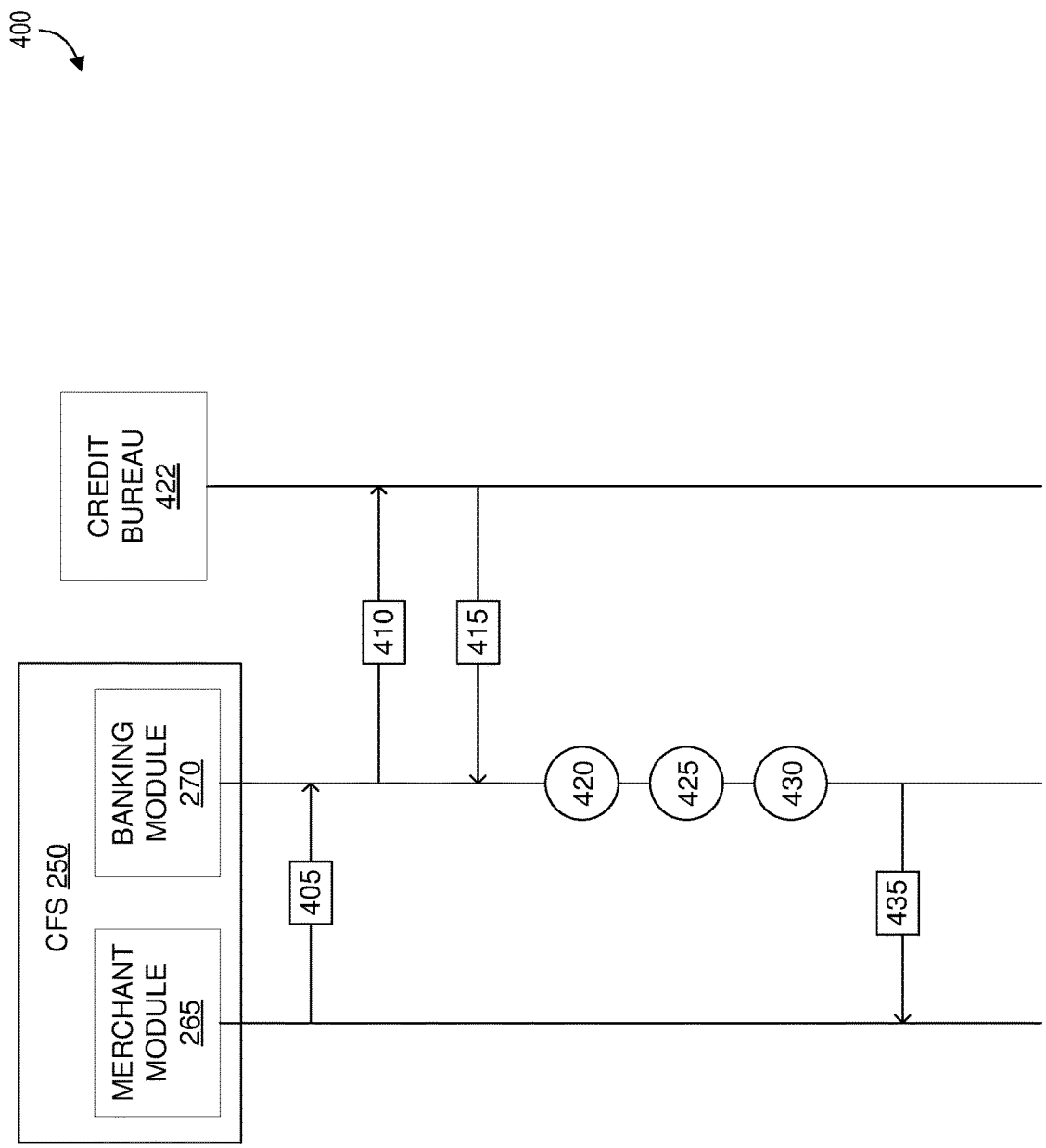
FIG. 4 is a sequence diagram illustrating an example underwriting process 400, according to an example implementation.

At 325, the merchant module 265 may transmit electronic loan documents to the borrower 230, which may be generated as part of the underwriting process 400, as shown in FIG. 4. In some embodiments, the electronic loan documents may be dynamically generated and then issued to the borrower 230 in real time following receipt of the acceptance of the confirmed offer of a financing plan. Further, in some embodiments, the electronic loan documents are issued in the name of a financial institution having a relationship with the CFS 250 (i.e., the financial institution to which the CFS 250 assigns the loan, as will be discussed in relation to FIG. 4).

In example embodiments, the electronic loan documents may include a transaction processing access device ("TPAD"), which may include a 16-digit credit card number for providing the borrower 230 access to the loan funds (i.e., allow the borrower 230 to make purchases using the funds). Further, in example embodiments, the TPAD may include a card verification value ("CVV") number and an expiration date such that, in conjunction with the 16-digit card number (i.e., credit card number), the merchant 220 may be able to process payment from the borrower 230 using a conventional credit card terminal as the merchant 220 would process a typical credit card payment, at 330. Further, in some embodiments, the CFS 250 may be configured to limit a TPAD such that the TPAD is limited to use with a particular merchant or merchants, as specified by the CFS 250. In other example embodiments, the CFS 250 may configure the TPAD such that the TPAD can be used with any merchant capable of processing credit card payments. In some embodiments, the TPAD is configured to allow a CFS 250 to provide installment loans on credit card rails.

In some embodiments, use of the TPAD may constitute acceptance of the terms and conditions of the installment loan by the borrower 230. As will be understood and appreciated, the disclosed credit application process 300 allows for an instant apply-and-buy solution with no delay in funding or next step required.

FIG. 4 is a sequence diagram illustrating an exemplary underwriting process 400, according to some embodiments. As discussed in relation to FIG. 3, after receiving borrower information and requested financing plan information, the CFS 250 may initiate an underwriting process 400. For example, in some embodiments, a merchant module 265 may receive the borrower information and the requested financing plan information and subsequently initiate the underwriting process 400.

In some embodiments, after receiving borrower information and requested financing plan information, a merchant module 265 may transmit the information to a banking module 270, at 405. At 410, the banking module 270 may transmit borrower information to a credit bureau 422 to request credit bureau information relating to the potential borrower. As will be understood, credit bureau information may include a borrower's 230 credit score or the borrower's 230 credit characteristic information, including but not limited to, credit card accounts, other loans (e.g., car loans, home loans), or other financial information (e.g., bank account balances, savings account balances, retirement account balances). In some embodiments, the banking module 270 may employ certain third-party software to assist with various processes of the banking module 270, which may include the acquisition of credit bureau information from a credit bureau 422. At 415, the banking module 270 may receive the credit bureau information relating to the potential borrower.

In certain embodiments, a CFS 250 may have relationships with a plurality of banks or lenders (i.e., multiple funding sources) capable of loaning money to borrowers 230 (i.e., potential candidates to approve the loan). As will be understood and appreciated, in general, the plurality of banks and lenders typically have varying risk tolerances and may have varying criteria upon which they base their lending decisions (i.e., bank credit policies). In some embodiments, a CFS 250 may comprise a banking module 270, which may comprise a rules engine relating to the lending policies (i.e., bank credit policies) of the various lending partners. For example, certain lenders may be willing to lend money to borrowers only in certain states, or borrowers may limit the amount of money they are willing to lend in a particular state. Further, certain lenders may only be willing to offer certain financing plans or may only be willing to make loans up to a certain dollar amount. Additionally, as will be understood and appreciated, lenders may factor credit bureau information into their lending decisions (i.e., credit bureau information may be factored into their bank credit policies). In some embodiments, various lenders may have additional criteria relating to credit bureau information that influences whether they are willing to approve a particular loan (i.e., customer risk profile). For example, certain lenders may not be willing to loan money to a borrower 230 unless the borrower 230 has a minimum credit score.

Accordingly, in some embodiments, depending on the information included in the borrower information, the requested financing plan information, and/or the credit bureau information, the banking module 270 may determine one or more banking partners or lenders (i.e., a subset of lenders) from the multiple funding sources who may be candidates to fund the requested loan based on lending criteria (i.e., bank credit policies) the lenders have provided to the CFS 250, at 420. Put differently, based on the requested financial plan information, the borrower information, and/or the credit bureau information, as well as the bank credit policies of the various lending partners, the banking module 270 may identify a subset of lenders who are candidates for approving the borrower's 230 requested loan because the requested financing plan information, the borrower information, and/or the credit bureau information align with or fall within the lenders' lending criteria (i.e., their bank credit policies, which may include FICO information, debt-to-income ratio, and various other information). Put differently, a particular lender's lending criteria may set guidelines for a borrower's maximum debt-to-income ratio or consumer credit risk score (e.g., FICO score) that will make the borrower eligible for a loan.

In example embodiments, the banking module 270 may not be able to determine a subset of lenders willing to approve the borrower's 230 requested loan. For example, the borrower 230 may have requested a loan amount or loan terms that no lender is willing to approve based on the borrower's 230 borrower information, the requested financing plan information, and/or the credit bureau information. In such instances, the banking module 270 may determine a subset of lenders who would approve an alternate loan (i.e., the banking module 270 may take a "second look"). In some embodiments, the CFS 250 could notify the borrower 230 that their request had been denied and ask if the borrower 230 would be interested in alternate loan options. If an application for credit is denied, the CFS 250 may generate an adverse action notice in compliance with legal requirements, according to some embodiments.

According to some embodiments, after determining a subset of lenders who are willing to approve the requested loan based on their bank credit policies, the banking module 270 may initiate a portfolio assignment process 425. In some embodiments, the banking module 270 may comprise a rules engine that incorporates bank funding commitments (i.e., the total amount of money a particular lender is committed to lending via the CFS 250), bank funding utilization (i.e., the total amount of the commitment that has been allocated), consumer credit risk profiles, whether the bank participates in a consumer's state, bank credit policies, and regulatory policies to properly assign a finance partner (i.e., bank or lender). Accordingly, in some embodiments, the portfolio assignment process 425 may involve determining the appropriate lender for a particular loan based on evaluating, for example, the lender's bank credit policies, bank funding utilization, consumer credit risk profiles, etc., that may influence which lender is most appropriate to assign a particular loan. In some embodiments, if two lenders are equally suited for assignment of a loan, the banking module 270 may determine which of the lenders is "next in line" to be assigned a loan, which may be based on the lender's utilization as well as other factors.

At 430, the banking module 270 may generate documents relating to the loan (i.e., electronic loan documents), which, as discussed, may include information such as the Truth in Lending Act disclosures (which may include, but are not limited to, the annual percentage rate, the amount financed, and the term of the installment loan), the loan agreement (which may include the name of the lender to which the loan was assigned at 425), the payment access device, and the lender's specific Gramm-Leach-Bliley privacy notice. At 435, the banking module 270 may transmit the electric loan documents to the merchant module 265 for presentation to the borrower 230. In some embodiments, the banking module 270 may transmit an email to borrower 230 that contains a link to a web portal where borrower 230 may access the electronic loan documents online. In some embodiments, the banking module may generate a physical copy of the electronic loan documents to mail directly to the borrower 230.

Figure 5:
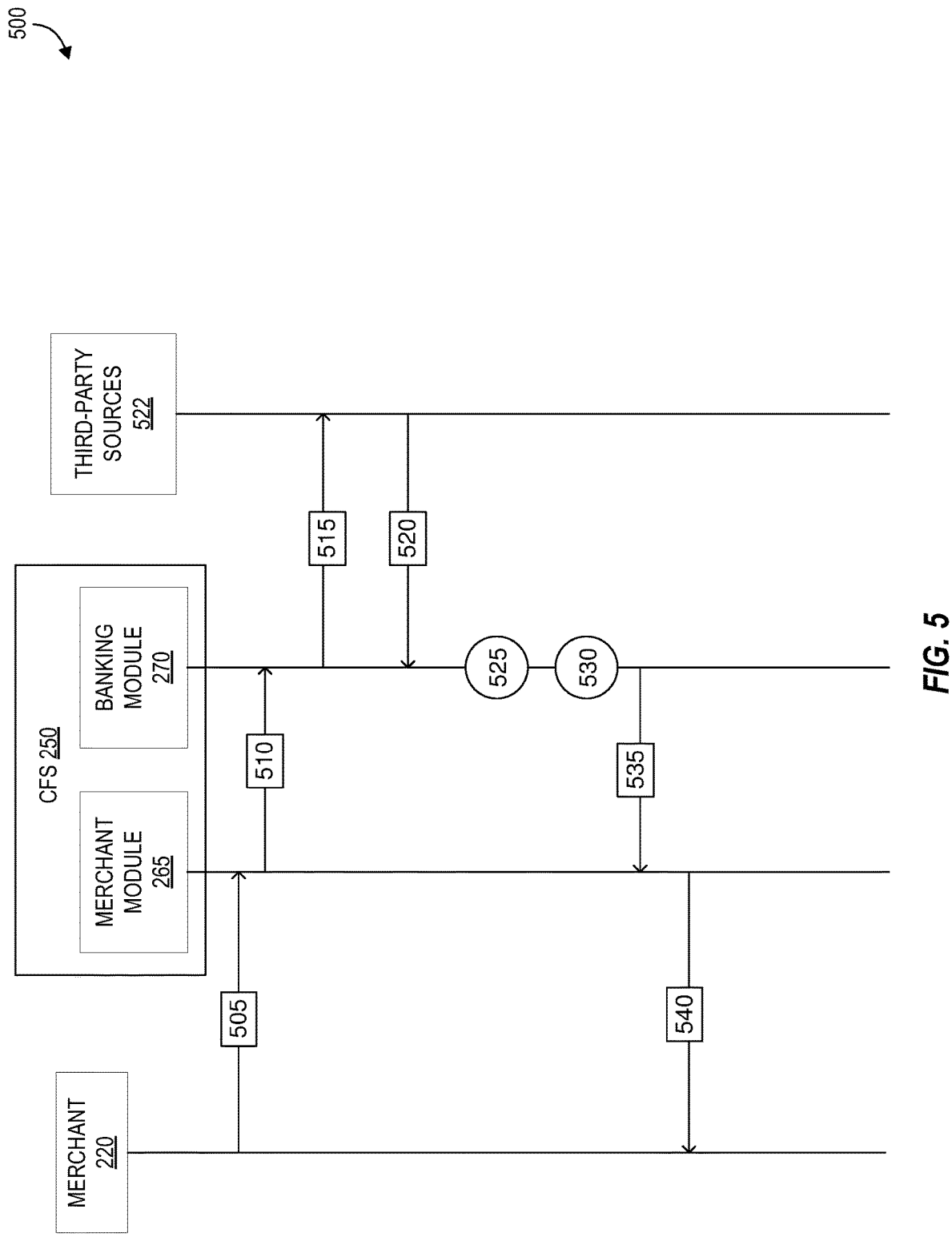
FIG. 5 is a sequence diagram illustrating an example merchant credentialing process 500, according to some embodiments.

In some embodiments, prior to a credit application process 300 or an underwriting process 400, a CFS 250 may initiate a merchant credentialing process 500, as shown in FIG. 5. As will be understood and appreciated, a merchant credentialing process 500 can occur prior to or independently of a credit application process 300 or an underwriting process 400. In some embodiments, a CFS 250 may utilize a merchant credentialing process 500 to evaluate the credit worthiness of a merchant 220 as well as to determine if a merchant 220 poses a fraud risk. As will be understood and appreciated, by performing a merchant credentialing process 500, a CFS 250 may be better able to protect the interests of potential borrowers 230. In particular, merchants deemed to have poor credentials based on a merchant credentialing process 500 may not have the opportunity to provide financing plans associated with a CFS 250. Alternatively, upon determining that a merchant 220 has superior credentials, a CFS 250 may designate to the merchant 220 desirable financing plans, which the merchant 220 may then offer to its customers.

For example, in some embodiments, a merchant 220 may be interested in providing financing plans to its customers or potential customers (i.e., potential borrowers 230). Accordingly, at 505, a merchant 220 may provide certain information (i.e., merchant information), which may include basic identifying information, to a CFS 250 such that the CFS 250 can initiate a merchant credentialing process 500. Additionally, a merchant 220 may provide information to the CFS 250 relating to a particular volume of loans that the merchant 220 is committed to offering to various potential customers (i.e., potential borrowers 230).

Upon receipt of the merchant information and the information relating to the volume of loans, at 510, a merchant module 265 may transmit the merchant information to a banking module 270, which may in turn transmit the merchant information to one or more third-party sources 522 to acquire additional information (i.e., merchant risk information) relating to the merchant's 220 credentials, at 515. For example, a third-party source 522 may provide business research and risk solution services relating to the merchant 220 (e.g., LexisNexis™ or Dun & Bradstreet, Inc.). Additionally, a third-party source 522 may provide information to help evaluate whether a merchant 220 may present a fraud risk. For example, a third-party source may indicate whether a merchant 220 has filed for bankruptcy or has recently or repeatedly reincorporated.

In some embodiments, at 520, a banking module 270 may receive merchant risk information from one or more third-party sources 522. Accordingly, at 525, the CFS 250 may initiate a credential evaluation process to determine a merchant's 220 credentials. In some embodiments, in performing a credential evaluation process, a CFS 250 may factor merchant risk information relating to the merchant 220, which may include evaluating information harvested from various business reports (e.g., Dun & Bradstreet reports), personal credit reports, state licenses, and other information to help determine the potential risk associated with a merchant 220. In addition, in some embodiments, a credential evaluation process may evaluate the volume of loans to which the merchant 220 has committed to offering. In an example embodiment, a credential evaluation process may determine that a merchant 220 who commits to offering a large volume of loans and who has favorable merchant risk information has favorable credentials. Accordingly, at 530, the banking module 270 may perform a rate plan assignment process in which the banking module 270 assigns desirable rate plans to the merchant 220, which the merchant 220 is then authorized to make available to potential borrowers (e.g., borrower 230). As will be understood and appreciated, a merchant 220 having less-favorable credentials may be assigned less-desirable rate plans. Accordingly, at 535, the banking module may transmit the assigned rate plans to the merchant module 265, which may in turn transmit the rate plans to the merchant 220, at 540. As will be understood and appreciated, upon receiving the assigned rate plans, the merchant 220 may begin offering the one or more plans to potential borrower's 230.

Figure 6:
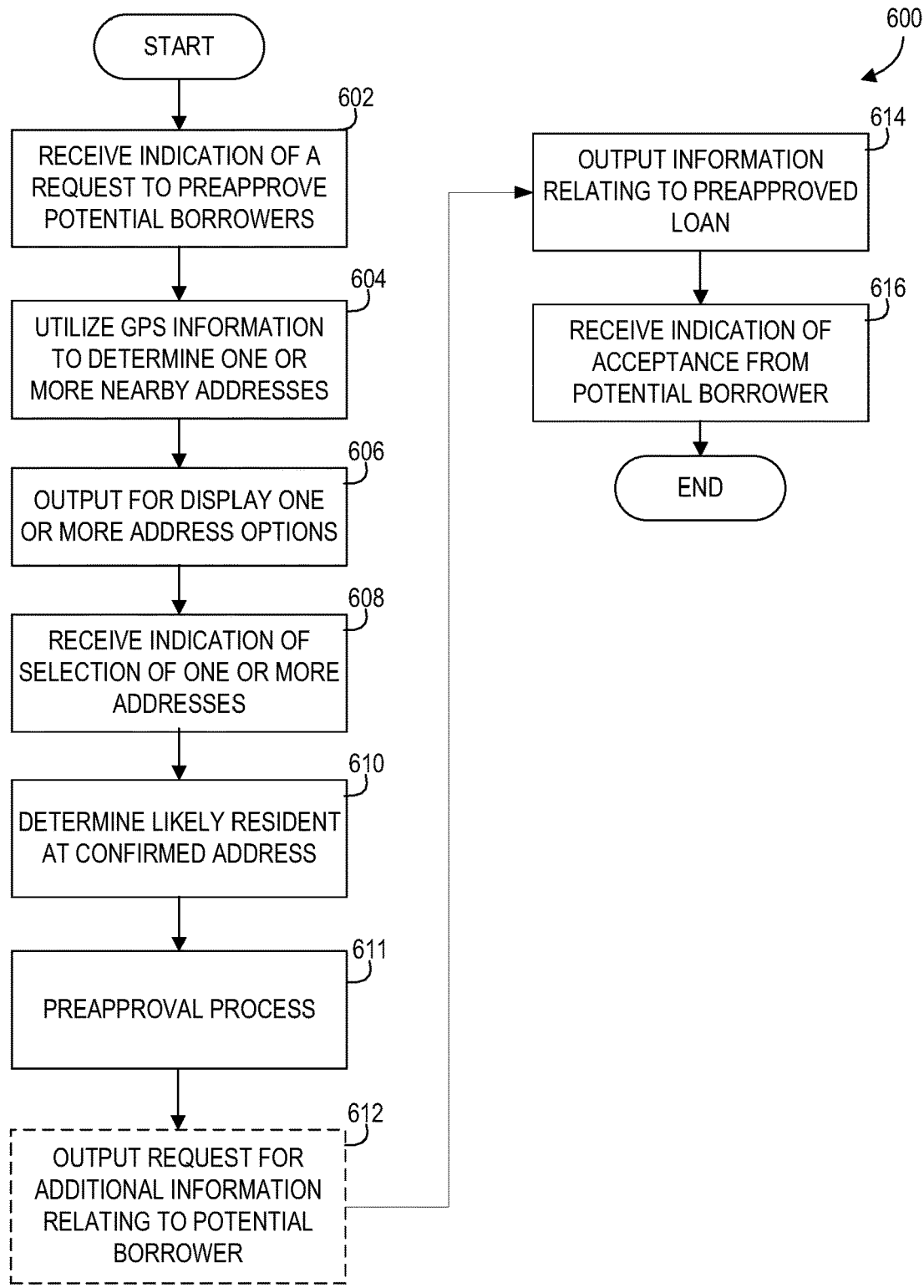
FIG. 6 is a flow chart illustrating an example preapproval process 600, according to some embodiments.

FIG. 6 is a flow chart illustrating an example preapproval process 600, according to some embodiments. In some embodiments, at 602, a merchant 220 may provide an input to a computing device (e.g., 240) indicating a desire to utilize an application for obtaining preapproval of one or more potential borrowers (e.g., 230) based on physical location (i.e., based on the physical location of the merchant 220 and/or the merchant's computing device 240). At 604, the computing device 240 may utilize GPS coordinates to determine one or more addresses near to the current location of the merchant 220 and the computing device 640, according to some embodiments. As will be appreciated, in this way, a merchant can use GPS coordinates to preapprove one or more potential borrowers in, for example, a particular neighborhood. Further, in some embodiments, the computing device 240 may provide the merchant 220 with the ability to enter a particular address by, for example, using a map application or a keyboard interface 101 or presence sensitive input interface 108 associated with the computing device 240.

In some embodiments, at 606, based at least in part on the GPS coordinates, the computing device 240 can present to the merchant 220 one or more addresses near to the current location of the merchant. Further, in some embodiments, at 608, the merchant 220 may provide an input to the computing device 240 indicating a selection of one or more addresses. At 610, the computing device 240 may determine the likely owner or resident at the confirmed address. For example, the computing device 240 may access one or more publicly available address databases via a network 205 (e.g., the internet).

After determining the likely resident at the confirmed address, at 610, the computing device 240 may initialize a preapproval process 611. In some embodiments, a preapproval process 611 may share many steps in common with an underwriting process 400, as discussed in relation to FIG. 4. Thus, for example, in some embodiments, after receiving information relating to the potential borrower to be preapproved (e.g., address information, first and last name, and various other borrower-related information determined at 610), a merchant module 265 may transmit the information to a banking module 270, and the banking module 270 may transmit the information relating to the potential borrower to a credit bureau 422 to request credit bureau information relating to the potential borrower. As will be understood, credit bureau information may include a credit score or information relating to the potential borrower's credit characteristics, including but not limited to, credit card accounts, other loans, or other financial information. As discussed above, in some embodiments, the banking module 270 may employ certain third-party software to assist with various processes of the banking module 270, which may include the acquisition of credit bureau information from a credit bureau. Subsequently, the banking module 270 may receive the credit bureau information relating to the potential borrower and determine one or more banking partners or lenders that may fund a loan for the potential borrower. For example, the banking module 270 may perform processes similar to those described in relation to FIG. 4 to determine a potential banking partner or lender.

In some embodiments, following the preapproval process 611, a merchant 220 can access the preapproval information using the computing device 240. For example, the merchant 220 may search for the potential borrower by name or address. Further, in some embodiments, the borrower 220 can access the information relating to the potential borrower hours or days after the preapproval process 611. In some embodiments, the information relating to the potential borrower may indicate that more information is necessary before a loan can be approved for that specific potential borrower (and will be clear that the potential borrower has not been declined). For example, the CFS 250 may require further information about the potential borrower before a loan can be approved for that potential borrower. Thus, for example, at 612, the computing device 240 may display a message asking that the potential borrower provide additional information such as date of birth and/or Social Security number, which can be sent to a CFS 250 for processing.

In some embodiments, at 614, the computing device 240 can output the information relating to a preapproved loan for display such that it can be reviewed by the merchant 220 and the potential borrower and such that the potential borrower can input an acceptance, at 616. As discussed, in some embodiments, acceptance by a borrower 230 may complete the loan application and trigger issuance of loan documents.

Figure 7:
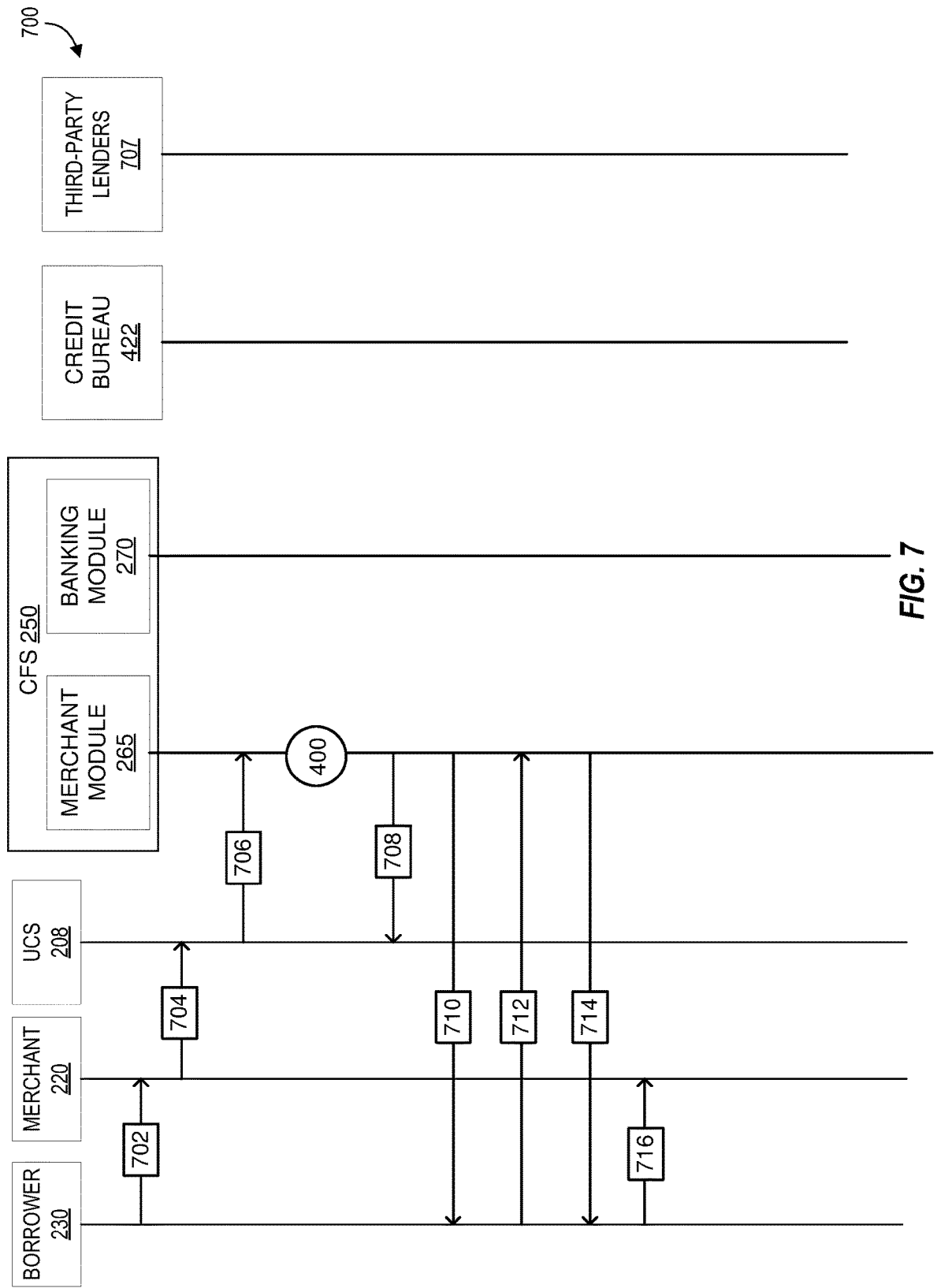
FIG. 7 is a sequence diagram illustrating an example loan facilitation process 700 that can involve one or more third-party lenders, according to an example implementation.

FIG. 7 is a sequence diagram illustrating an example loan facilitation process 700 for credit applications and underwriting, origination, and assignment of related loans that can involve one or more third-party lenders ("TPLs") 707*n*, which may be completed in real time, according to some embodiments. As will be appreciated, the process 700 illustrated in FIG. 7 is similar in nature as to the processes 300 and 400 shown in FIGS. 3 and 4, respectively, except that UCS 208 stands between the borrower 230 and merchant 220, on the one hand, and the CFS 250 and TPLs 707*n*, on the other, and acts as a facilitator between the various entities. Additionally, the CFS 208 stands between the borrower 230 and merchant 220, on the one hand, and the TPLs 707*n* on the other. Those of skill in the art will appreciate that, in some circumstances, it is advantageous to have a relationship between a dedicated pool of potential lenders as well as access to various TPLs who, while not members of the pool of potential lenders, would still like to be considered for certain loans and who will make their own determinations with respect to servicing certain loans. For example, TPLs may be interested in servicing loans they may be considered "riskier" than the loans that can be considered by the pool of applications associated with the banking module 270. As will further be appreciated, a UCS 208 may have relationships with merchants who have relationships with various TPLs who are not part of a pool of potential lenders associated with a CFS 250.

Accordingly, as shown in FIG. 7, in an example scenario, at 702, a borrower 230 provides borrower information (i.e., credit application information as previously discussed) to a merchant 220, which may be used to obtain financing. And as previously discussed in relation to FIG. 3, the borrower 230 may provide the borrower information to the merchant 220 in a variety of ways, which the merchant 220 may then provide to the UCS 208, though in some implementations the borrower 230 may provide information directly to the UCS 208 without the aid of the merchant 220 in a manner similar to those described in relation to FIG. 3. Also, similar to what was explained in relation to FIG. 3, in addition to providing contact information at 702, a borrower 230 may provide an indication of a financing plan the borrower 230 is interested in obtaining (i.e., requested financing plan information). As shown in FIG. 7, after the merchant 220 receives the borrower information and financing plan information from the borrower 230, the merchant 220 may transmit the borrower information and financing plan information to the UCS 208, which may in turn transmit the information to a merchant module 265 of a CFS 250, at 706, in a manner similar to that described in relation to FIG. 3. Upon receipt of the borrower's 230 borrower information (and requested financial plan, according to example embodiments), the merchant module 265 may initiate an underwriting process 400 as described in relation to FIG. 4.

Following the underwriting process 400, in some embodiments, a merchant module may notify a UCS 208 that a lender has been identified, at 708, and the merchant module 265 may transmit a credit offer (i.e., a confirmed offer of a financing plan) to the borrower 230 for the borrower to accept or reject, at 710, in a manner similar to that discussed in relation to FIG. 3. As discussed previously, if the borrower 230 is interested in accepting the credit offer (i.e., accepting the confirmed offer of a financing plan), the borrower may transmit an acceptance of the confirmed offer of a financing plan to the merchant module 265, at 712, though of course the borrower 230 may reject the offer and pursue an alternative financing plan. As further shown in FIG. 7, the merchant module 265 may transmit electronic loan documents to the borrower 230, at 714, in a manner similar to that which was discussed in relation to FIGS. 3 & 4. Finally, as shown in FIG. 7, the merchant 220 may be able to process payment from the borrower 230 using a conventional credit card terminal as the merchant 220 would process a typical credit card payment, using aspects of the electronic loan documents, at 716 and in a manner similar to what was discussed in relation to FIG. 3.

FIG. 8 is another sequence diagram illustrating an example underwriting and credit application process 800 involving one or more TPLs 707*n*, which may be completed in real time, according to some embodiments. The process 800 illustrated in FIG. 8 is similar in nature to aspects of the processes 300, 400, and 700 shown in FIGS. 3, 4, and 7. Similar to the process 700 shown in FIG. 7, the process 800 includes a UCS 208 that stands between the borrower 230 and merchant 220, on the one hand, and the CFS 250 on the other. Additionally, the CFS 208 stands between the borrower 230 and merchant 220, on the one hand, and the TPLs 707*n* on the other.

Similar to the embodiment shown in FIG. 7, in an example scenario, at 802, a borrower 230 provides borrower information (i.e., credit application information as previously discussed) to a merchant 220, which may be used to obtain financing. And as previously discussed in relation to FIG. 3, the borrower 230 may provide the borrower information to the merchant 220 in a variety of ways, which the merchant 220 may then provide to the UCS 208, though in some implementations the borrower 230 may provide information directly to the UCS 208 without the aid of the merchant 220 in a manner similar to those described in relation to FIG. 3. Also, similar to what was explained in relation to FIG. 3, in addition to providing contact information, a borrower 230 may provide an indication of a financing plan the borrower 230 is interested in obtaining (i.e., requested financing plan information). After the merchant 220 receives the borrower information and financing plan information from the borrower 230, the merchant 220 may transmit the borrower information and financing plan information to the UCS 208, which may in turn transmit the information to a merchant module 265 of a CFS 250, at 806, in a manner similar to that described in relation to FIG. 3. Upon receipt of the borrower's 230 borrower information (and requested financial plan, according to example embodiments), the merchant module 265 may initiate an underwriting process 400 as described in relation to FIG. 4.

During the underwriting process 400 (e.g., at 420), the banking module 270 may determine that there are no lenders in the pool of lenders willing to service the borrower 230 and/or the borrower's requested loan. In such a scenario, and as shown in FIG. 8, the merchant module 265 may notify the UCS 208, at 808, that the underwriting process 400 was unable to identify an appropriate lender (i.e., a lender who was able to service the borrower 230 and/or the borrower's requested loan according to the lenders' various lending criteria, bank credit policies, etc.). Accordingly, the UCS 208 may notify the merchant 220, at 810, which may notify the borrower 230, at 812, in a manner similar to that in which the UCS 208 receives information from the borrower 230 and/or merchant 220.

In some implementations, the borrower 230 may not receive any specific indication that no appropriate lender was identified. In other words, the borrower 230 may have no insight into the behind-the-scenes workings of the process 800 and, in particular, process 400. Instead, the borrower 230 may simply receive a request to provide additional information (which would trigger a continuing of the process) or would have the option to not continue further. Accordingly, as further shown in FIG. 8, in some implementations, the borrower 230 may be presented with the option of providing further information, which can constitute an implicit option of continuing with the application process with various other outside lenders (i.e., lenders outside of the CFS 250 such as the TPLs 707*n*). If the borrower 230 wishes to continue with the process, the borrower 230 may submit additional information to the merchant 220, at 814, who may then transmit the information to the UCS 208, at 816, in a manner similar to that described in relation to 802 and 804. For example, while the borrower information submitted to the merchant module 265 at 806 may have included what could be considered basic or preliminary borrower information (e.g., borrower's Social Security Number, date of birth, street number (but not full address), zip code, and phone number, along with an amount to be financed and an annual salary amount, the additional (supplemental) borrower information presented at 814 may include additional details relating to the borrower 230 that can assist the various TPLs 707*n* in evaluating the borrower 230 as a loan candidate. As nonlimiting examples, such supplemental information can include full name, phone number, driver's license number, state, and expiration date, full address information (street, city, state, and zip), residence history, employment history and status (including, for example, employer name, job title, company phone number, borrower's work number, length of employment, employment income), co-signer information, sources of additional income, and the like. Those of skill will appreciate that the basic borrower information and supplemental borrower information are for example and items of supplemental borrower information can constitute basic borrower information and vice versa depending on the implementation. Additionally, in some implementations, when the borrower 230 is presented with the option to provide additional information, the borrower's previously provided borrower information will be populated such that the borrower does not have to re-enter the information. Further, it will be understood that, in certain implementations, a borrower may provide one set of borrower information that constitutes both basic and supplemental borrower information at 806, and the UCS 208 may package the information as is appropriate for the needs and requirements of the CFS 250 and the various TPLs 707*n*. As will be appreciated, in such a configuration, and after inputting the requested information, a borrower is unaware of which information is being passed to the various entities and thus experiences only a single instance of data entry.

As will also be appreciated, various TPLs 707*n* may have their own requirements for what borrower information (i.e., basic borrower information and supplemental borrower information) is required for their respective borrower evaluations, and aspects of the systems and methods can be configured to request from a borrower TPL-specific information. Additionally, in certain implementations, the UCS 208 may be configured to request and receive, at 812-816, supplemental borrower information and, based on various TPL-specific requirements, filter the received supplemental borrower information into a subset of supplemental borrower information that is tailored to a particular TPL.

As further shown in FIG. 8, after receiving the supplemental borrower information, the UCS 208 can transmit that information to any number of TPLs 707*n*, at 818*n*, according to preferences and requirements of each TPL 707n and/or merchant 230. In some implementations, the UCS 208 can transmit the supplemental borrower information along with the borrower information received at 804 to the TPLs 707n. In certain implementations, the UCS 208 will send borrower information (either supplemental borrower information or a combination of borrower information and supplemental borrower information) to the TPLs 707n, but will not send borrower requested plan information. As will be appreciated, certain TPLs 707n may not be authorized to offer plans that the pool of lenders associated with CFS 250 are authorized to offer.

As noted, UCS 208 may transmit some combination of borrower information, supplemental borrower information, and requested plan information to any number of TPLs 707n, at 818n. For example, the merchant 220 may have specific terms that mandate that the UCS 208 send borrower information to a preferred TPL 707n (e.g., TPL 707a) and wait for a response from TPL 707a before taking further action. In such a scenario, if TPL 707a elects to service the borrower 230, then the process 800 may proceed as shown to 828. If, on the other hand, TPL 808a declines the opportunity to service the borrower 230, then the UCS 208 may send the requisite information to a next-in-line TPL 707n (e.g., TPL 707b). As will be understood, this process may iteratively occur until a TPL 707n accepts the opportunity to service the borrower 230 or until each TPLn declines the opportunity. In yet other implementations, the UCS 208 may send the requisite information to multiple TPLs 707n associated with the merchant 220, and the first TPL 707n to respond (e.g., TPL 707d) may be afforded the opportunity to engage the borrower 230. Alternatively, any TPL 707n that responds in a specified time period may be afforded the opportunity to engage the borrower 230. In other words, the borrower 230 may be presented with various options as the different TPLs 707n that responded may offer different types of plans. Further still, a TPL 707n who initially declines to service the borrower 230 may later decide to offer the borrower 230 a loan separate and apart from the disclosed systems and methods. For example, such a TPL 707n can directly mail or email the borrower 230 based on the borrower information received by the TPL 707n. As will be appreciated, various implementations can be configured for controlling the manner and order in which the UCS 208 provides the requisite information to the TPLs 707n.

As further shown in FIG. 8, the process 800 may include the UCS 208 notifying the merchant 220, at 820, that the requisite borrower information (i.e., some combination of the borrower information, supplemental borrower information, and requested plan information) has been sent to one or more TPLs 707n. The merchant 220 may then notify the borrower 230, at 822, that the requisite information has been sent out and thus the loan procedure is continuing.

Upon receiving the requisite loan information, the TPLs 707n may request and receive credit bureau 422 information relating to the borrower 230, at 824 and 826, in a manner similar to that discussed in relation to FIG. 4 and, in particular, with respect to 410 and 415 of FIG. 4. It will be understood that the various TPLs 707n can have their own requirements and policies regarding whether such a request is needed.

In some implementations, once a TPL 707n (e.g., TPL 707e) has made a decision to service the borrower 230, that TPL 707e may notify the UCS 208 of the decision, at 838, and the UCS 230 may notify the merchant 220, at 830, that the TPL 707e has confirmed that it will be servicing the borrower 230. As will be understood, the UCS 208 may notify a backend of the merchant 220 of the decision received from the TPL 707e. As further shown in FIG. 8, the TPL 707e may additionally directly notify the merchant 220 and the borrower 230, at 832 and 834, respectively, of the decision to process a loan for the borrower 230.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the sequence diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the sequence diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    receiving, at a first computing device and from a computing device associated with a particular borrower or a computing device associated with a merchant, (i) preliminary borrower information relating to the particular borrower, the preliminary borrower information including geolocation data indicative of a location of the computing device associated with the particular borrower and (ii) requested financing plan information relating to a financing plan as requested by the particular borrower;
    outputting, for delivery to a second computing device, (i) the preliminary borrower information relating to the particular borrower and (ii) the requested financing plan information relating to the financing plan as requested by the particular borrower;
    receiving, at the first computing device and from the second computing device, results of a pre-approval process conducted at the second computing device, the pre-approval process based on the location of the computing device associated with the particular borrower, the results of the pre-approval process including data indicative of a decision to deny the requested financing plan;
    outputting, for delivery to the computing device associated with the particular borrower or the computing device associated with the merchant, (i) an indication of the decision to deny the requested financing plan and (ii) a request for additional borrower information relating to the particular borrower;
    receiving, at the first computing device and from the computing device associated with the particular borrower or the computing device associated with the merchant, the additional borrower information relating to the particular borrower;
    outputting, for delivery to at least one computing device associated with at least one lender, at least one selected from a group consisting of (i) at least a portion of the preliminary borrower information relating to the particular borrower, (ii) at least a portion of the additional borrower information relating to the particular borrower, and (iii) the requested financing plan information;
    receiving, at the first computing device and from a third-party, results of a merchant credentialing process, the results comprising merchant fraud risk information and a creditworthiness of the merchant to offer the requested financing plan contained in the requested financing plan information; and
    outputting, for delivery to the computing device associated with the particular borrower or the computing device associated with the merchant, a confirmation that at least one selected from the group consisting of (i) at least a portion of the preliminary borrower information relating to the particular borrower, (ii) at least a portion of the additional borrower information relating to the particular borrower, and (iii) the requested financing plan information was sent to at least one computing device associated with at least one lender.

2. The method of claim 1 further comprising:
    receiving, at the first computing device and from the at least one computing device associated with the at least one lender, an indication of the at least one lender's decision to service a loan for the particular borrower; and
    outputting, for delivery to a computing device associated with the merchant, a confirmation of the at least one lender's decision to service the loan for the particular borrower.

3. The method of claim 1, wherein borrower information relating to the particular borrower includes at least one of Social Security Number, date of birth, street number, zip code, and phone number.

4. The method of claim 1, wherein additional information relating to the particular borrower includes at least one of full name, phone number, driver's license number, driver's license state, driver's license expiration date, full address information, residence history, employment history, employment status, co-signer information, and sources of additional income.

5. The method of claim 4, wherein employment history comprises at least one of employer name, job title, company phone number, length of employment, and employment income for a particular instance of employment.

6. A method comprising:
    receiving, at a first computing device and from a computing device associated with a particular borrower or a computing device associated with a merchant, (i) borrower information relating to the particular borrower, the borrower information including geolocation data indicative of a location of the computing device associated with the particular borrower and (ii) requested financing plan information relating to a financing plan as requested by the particular borrower;
    outputting, for delivery to a second computing device, (i) the borrower information relating to the particular borrower and (ii) the requested financing plan information relating to the financing plan as requested by the particular borrower;
    receiving, at the first computing device and from the second computing device, results of a pre-approval process conducted at the second computing device, the pre-approval process based on the location of the computing device associated with the particular borrower, the results of the pre-approval process including data indicative of a decision to deny the requested financing plan;
    outputting, for delivery to at least one computing device associated with at least one lender, at least one of (i) at least a portion of the borrower information relating to the particular borrower and (ii) the requested financing plan information;
    receiving, at the first computing device and from a third-party, results of a merchant credentialing process, the results comprising merchant fraud risk information and a creditworthiness of the merchant to offer the requested financing plan contained in the requested financing plan information; and outputting, for delivery to the computing device associated with the particular borrower or the computing device associated with the merchant, a confirmation that at least one of (i) at least a portion of the borrower information relating to the particular borrower and (ii) the requested financing plan information was sent to at least one computing device associated with at least one lender.

7. The method of claim 6, wherein the computing device outputs the at least a portion of the borrower information relating to the particular borrower for delivery to the at least one computing device associated with the at least one lender according to policies of the at least one lender.

8. The method of claim 6 further comprising:
receiving, at the first computing device and from the at least one computing device associated with the at least one lender, an indication of the at least one lender's decision to service a loan for the particular borrower; and outputting, for delivery to a computing device associated with the merchant, a confirmation of the at least one lender's decision to service the loan for the particular borrower.

9. A method comprising:
receiving, at a first computing device and from a computing device associated with a particular borrower or a computing device associated with a merchant, (i) borrower information relating to the particular borrower, the borrower information including geolocation data indicative of a location of the computing device associated with the particular borrower and (ii) requested financing plan information relating to a financing plan as requested by the particular borrower;

outputting, for delivery to a second computing device, (i) the borrower information relating to the particular borrower and (ii) the requested financing plan information relating to the financing plan as requested by the particular borrower;

receiving, at the first computing device and from the second computing device, results of a pre-approval process conducted at the second computing device, the pre-approval process based on the location of the computing device associated with the particular borrower, the results of the pre-approval process including data indicative of a decision to deny the requested financing plan;

outputting, for delivery to the computing device associated with the particular borrower or the computing device associated with the merchant, a request for borrower confirmation to continue pursuit of a financing plan;

responsive to receiving, at the first computing device and from the computing device associated with the particular borrower or the computing device associated with the merchant, an indication of a desire to continue pursuing the financing plan, outputting, for delivery to at least one computing device associated with at least one lender, at least one of (i) at least a portion of the borrower information relating to the particular borrower and (ii) the requested financing plan information;

receiving, at the first computing device and from a third-party, results of a merchant credentialing process, the results comprising merchant fraud risk information and a creditworthiness of the merchant to offer the requested financing plan contained in the requested financing plan information; and outputting, for delivery to the computing device associated with the particular borrower or the computing device associated with the merchant, a confirmation that at least one of (i) at least a portion of the borrower information relating to the particular borrower and (ii) the requested financing plan information was sent to at least one computing device associated with at least one lender.

* * * * *

UNITED STATES PATENT AND TRADEMARK OFFICE
CERTIFICATE OF CORRECTION

| | | |
|---|---|---|
| PATENT NO. | : 11,823,259 B2 | Page 1 of 1 |
| APPLICATION NO. | : 17/039966 | |
| DATED | : November 21, 2023 | |
| INVENTOR(S) | : D. Zalik et al. | |

It is certified that error appears in the above-identified patent and that said Letters Patent is hereby corrected as shown below:

On the Title Page

At item (72) Inventors Data:
Please add Jagjeevan Gopireddy, Atlanta, GA (US) as an inventor Signed and Sealed this
Eighteenth Day of June, 2024

Katherine Kelly Vidal
*Director of the United States Patent and Trademark Office*